US007101822B2

(12) United States Patent
Devisme et al.

(10) Patent No.: US 7,101,822 B2
(45) Date of Patent: Sep. 5, 2006

(54) METHOD FOR DECONTAMINATING SOLID IODINE FILTERS

(75) Inventors: Frederic Devisme, Roquemaure (FR); Jean-Pierre Donnarel, Saint Alexandre (FR); Aime Vaudano, Bagnos-sur-Ceze (FR)

(73) Assignees: Commissariat A l'Energie Atomique, Paris (FR); Compagnie Generale des Matieres Nucleaires, Velizy Villacoublay (FR)

( * ) Notice: Subject to any disclaimer, the term of this patent is extended or adjusted under 35 U.S.C. 154(b) by 56 days.

(21) Appl. No.: 10/469,828

(22) PCT Filed: Mar. 12, 2002

(86) PCT No.: PCT/FR02/00869

§ 371 (c)(1),
(2), (4) Date: Sep. 5, 2003

(87) PCT Pub. No.: WO02/073629

PCT Pub. Date: Sep. 19, 2002

(65) Prior Publication Data

US 2004/0077482 A1 Apr. 22, 2004

(30) Foreign Application Priority Data

Mar. 13, 2001 (FR) .................................. 01/03391

(51) Int. Cl.
*B01J 20/34* (2006.01)

(52) U.S. Cl. ........................................................ 502/28

(58) Field of Classification Search .................. 502/28, 502/24, 25, 26
See application file for complete search history.

(56) References Cited

U.S. PATENT DOCUMENTS

| | | | | |
|---|---|---|---|---|
| 3,981,961 | A | | 9/1976 | Germain et al. |
| 4,162,230 | A | * | 7/1979 | Horwitz et al. ............. 252/640 |
| 4,188,361 | A | * | 2/1980 | Rowden ........................ 423/9 |
| 4,229,421 | A | * | 10/1980 | Chapman et al. ............. 423/10 |
| 4,681,705 | A | * | 7/1987 | Robertson .................... 558/20 |
| 4,983,300 | A | * | 1/1991 | Germain et al. ............ 210/634 |
| 5,135,728 | A | * | 8/1992 | Karraker ...................... 423/20 |

FOREIGN PATENT DOCUMENTS

| | | |
|---|---|---|
| EP | 0 638 907 | 2/1995 |
| FR | 2 773 176 | 7/1999 |
| GB | 2 004 407 | 3/1979 |
| WO | 99 23667 | 5/1999 |
| WO | 00 13188 | 3/2000 |

OTHER PUBLICATIONS

Modolo et al: "Investigations on the partitioning of 129I from silver-impregnated silica in preparation for future transmutation" Nuclear Technology, American Nuclear Society. La Grange Park, Illinois, US, vol. 117, No. 1, 1997, pp. 80-86, XP002151845 ISSN: 0029-5450 cited in the application p. 81, right-hand column, paragraph 3, p. 83, right-hand column, paragraph 2, p. 84, left-hand column, paragraph 1.
Modolo et al.: "Investigation on the partitioning of 129I from silver-impregnated silica in preparation for future transmutation" Nuclear Technology, vol. 117, No. 1, pp. 80-86, 1997.
G. Modolo et al.: "Seperation of Iodine from AC 6120 adsorber material for transmutation" International Conference on Evaluation of Emerging Nuclear Fuel Cycle Systems pp. 1244-1251, Sep. 11,1995-Sep. 14, 1995.

* cited by examiner

*Primary Examiner*—Edward M. Johnson
(74) *Attorney, Agent, or Firm*—Oblon, Spivak, McClelland, Maier & Neustadt, P.C.

(57) ABSTRACT

The invention relates to a process for decontaminating solid iodine filters containing silver iodide, silver iodate and/or physisorbed molecular iodine.

This process consists in placing the filter in contact with an aqueous solution of a reducing agent chosen from hydroxylamine, hydroxylamine salts, ascorbic acid, ascorbic acid salts, ascorbyl esters, sodium borohydride, sodium hypophosphite, formaldehyde, urea, formic acid and mixtures thereof, to extract the iodine from the filter and dissolve it in the aqueous solution.

The dissolution of the silver, in the solution of reducing agent or in another suitable aqueous solution, may also be ensured, simultaneously or successively.

16 Claims, No Drawings

METHOD FOR DECONTAMINATING SOLID IODINE FILTERS

TECHNICAL FIELD

The present invention relates to a process for decontaminating solid iodine filters used in the nuclear industry.

In plants for reprocessing spent nuclear fuels, the recovering of the residual iodine contained in the gaseous effluents in the form of molecular iodine $I_2$ and/or of organoiodine compounds such as iodoalkanes or alkyl iodides, for example $CH_3I$, is performed, after discharging the gaseous effluents, by means of solid mineral traps commonly known as iodine filters. These are circular cartridges filled with porous alumina or silica beads, impregnated with silver nitrate, these beads constituting the actual filter. In these iodine filters, the iodine reacts with the silver nitrate to form iodine compounds such as silver iodide and silver iodate, possibly with a small presence of physisorbed molecular iodine $I_2$, silver iodide being predominant and sparingly soluble in water.

These iodine filters constitute a solid waste contaminated with iodine $^{129}I$, which cannot be directly surface-stored, and for which no matrix is currently available for deep-level storage.

It would therefore be advantageous to decontaminate these filters in order to remove the iodine they contain, which would allow the declassification of the waste for admission into surface storage after conditioning in a suitable matrix. For conditioning of this type, for example in a cement matrix, the residual admissible iodine content is 1.3 or 6.3 mg of iodine per g of filter, depending on the package chosen.

PRIOR ART

G. Modolo and R. Odoj described in Proc. International Conference on Evaluation of Emerging Nuclear Fuel Cycle Systems (Global 1995), 11 to 14 Sep. 1995, Versailles, France, Vol. 2, pp. 1244–1251 [1] and in Nuclear Technology, Vol. 117, 1997, p. 80–86 [2], the separation of iodine using iodine filters of this type by extraction with sodium sulphide or hydrazine, or by reduction with hydrogen.

The object of the studies reported by Modolo et al. was solely the recovery in solution of the maximum amount of iodine 129 in order to transmute it in a reactor and thus reduce its duration of harmfulness, rather than the decontamination of the porous solid support.

In the case of sodium sulphide, the silver iodide is converted into insoluble silver sulphide and into soluble sodium iodide, but this process has the drawback of producing effluents containing sulphides that can cause corrosion of the plants and unwanted precipitations.

In the case of a reductive heat treatment with hydrogen, obtaining an advantageous decontamination factor (170 i.e. 0.77 mg of iodine/g of filter, i.e. 0.6% of the initial content of 128 mg of iodine per g of filter) requires the process to be performed at a temperature above 500° C. for 6 hours, but then comes up against the increasing volatilization of AgI. The volume content of hydrogen in the gas mixtures used ($N_2$—$H_2$ at constant rate) is from 10% to 100%, which poses certain problems on the industrial scale, given the risks associated with using hydrogen and with corrosion.

In the case of hydrazine, aqueous hydrazine solutions are used as reducing agent to reduce the $Ag^+$ cation to silver metal, releasing iodine in the form of soluble iodide. However, the lowest residual iodine content observed is 1.9 mg of iodine per g of filter, i.e. 1.5% of the initial content of 128 mg of iodine per g of filter, and a decontamination factor of 67.

Furthermore, this process is laborious since it involves repeated treatments (several successive washes with highly concentrated solutions of hydrazine-based, $N_2H_4$ at 5 mol.$L^{-1}$, interspersed with sequences of decantation and then filtration of the solid beads).

Moreover, the authors observe purple vapours above the solution, corresponding to a release of iodine that is therefore not entirely recovered in solution in the form of iodide, thus necessitating a treatment of the gases to recover the iodine. Thus, this process does not producte an iodine separation that is sufficient to declassify this waste. Furthermore, the hydrazine may lead to the formation of unstable azides, with risks of explosion.

The subject of the present invention is, specifically, a hydrometallurgical (wet-route) process for treating an iodine filter, which produces a sufficient decontamination of solid iodine filters, for example a residual iodine content of less than or equal to 1.1 mg of iodine per g of filter for an iodine-saturated filter, which has an initial content of 140 mg of iodine per g of sorbent.

DESCRIPTION OF THE INVENTION

One subject of the invention is a process for decontaminating a solid iodine filter containing silver iodide, silver iodate and/or physisorbed molecular iodine, which consists in placing the filter in contact with an aqueous solution of a reducing agent chosen from hydroxylamine, hydroxylamine salts, for example hydroxylammonium nitrate, ascorbic acid, ascorbic acid salts such as sodium ascorbate, ascorbyl esters such as ascorbyl palmitate, sodium borohydride, sodium hypophosphite, formaldehyde, urea, formic acid and mixtures thereof, to extract the iodine from the filter and dissolve it in the aqueous solution.

According to the invention, a reducing agent is thus used to convert the iodine compounds included in or present on the solid filter into a soluble portion consisting of iodide anions and into an insoluble portion consisting of silver in metallic form, which remains predominantly in the pores of the filter.

In the process of the invention, the choice of a reducing agent other than the hydrazine used in documents [1] and [2] makes it possible to avoid the safety problems posed by using this reagent, i.e. its instability in nitric solution, associated with the potential formation of explosive azides. Furthermore, the destruction of the spent hydrazine solutions is difficult and generates unwanted effluents, in particular during the use of nitrites in large excess in acidic medium.

On the other hand, the use, in accordance with the invention, of hydroxylamine and especially of ascorbic acid (or vitamin C) and also of the salts and derivatives thereof, does not present these drawbacks. Ascorbic acid is entirely safe to use. As regards hydroxylamine, only very specific concentration, temperature and confinement conditions can result in violent reactions, but these may be readily avoided by means of the elementary precautionary rules adhered to by any good operator (in particular satisfactory venting); there is no generation of azides in any case. These reagents are easy to destroy. It is not obligatory for ascorbic acid, but may be performed in basic medium at moderate temperature; hydroxylamine, in dilute solution, may also be degraded in alkaline medium, like ascorbic acid, or by mild oxidation, for example, with aqueous hydrogen peroxide solution in slightly acidified medium. Ascorbic acid and hydroxylamine are therefore entirely compatible with the processing of the effluents from factories for reprocessing spent nuclear fuels.

Furthermore, the process of the invention is easy to carry out and leads to a residual iodine content that is markedly lower than the norms admissible to allow the declassification of waste.

The solid filters that may be processed by the process of the invention may be of various types, and may comprise a mineral or organic support. Examples of mineral supports that may be mentioned include ceramics, in particular porous ceramics, such as silica, alumina, other ceramic oxides, and also carbides and nitrides.

Examples of organic supports that may be mentioned include polymer supports consisting of organic resins, for example ion-exchange resins.

These supports are impregnated with silver nitrate, which reacts with iodine to form iodine compounds such as silver iodide and silver iodate.

Thus, the iodine filter becomes charged with radioactive iodine originating from gaseous effluents such as those from plants for the reprocessing of spent nuclear fuels. It generally consists of porous silica or alumina beads, containing silver iodide, silver iodate and/or physisorbed molecular iodine.

According to the invention, the following reduction reactions are carried out to recover the iodine in aqueous solution:

| | |
|---|---|
| $AgI + e' \rightarrow Ag_{(c)} + I^-_{(aq)}$ | (half-reaction 1) |
| standard potential, $E^0_1 = -0.1522$ V/ENH | |
| $AgIO_3 + e^- \rightarrow Ag_{(c)} + IO_3^-{}_{(aq)}$ | (half-reaction 2) |
| standard potential, $E^0_2 = +0.354$ V/ENH | |
| $Ag^+(aq) + e^- \rightarrow Ag_{(c)}$ | (half-reaction 3) |
| standard potential, $E^0_3 = +0.7991$ V/ENH | |
| $IO_3' + 3H_2O + 6e^- \rightarrow I^- + 6\ OH^-$ | (half-reaction 4) |
| standard potential, $E^0_4 = +0.257$ V/ENH (in basic medium) | |

in basic medium, molecular iodine dismutes to iodide and iodate, and the reduction thus comes down to that of the $IO_3^-$ anion.

To carry out these reactions, any reducing agent with a standard potential or an apparent potential, in a suitable pH range, of less than $E^0_1$ (which is the lowest potential) is suitable if the reduction mechanism directly involves silver iodide AgI. If it is in fact the $Ag^+$ cation resulting from the dissociation of AgI that is reduced, the potential of the reducing agent must then be less than $E^0_4$ in order for it to be oxidized by all the iodine and silver species present, which correspond to the half-reactions 2, 3 and 4. If the reduction of the iodate directly involves $AgIO_3$, the maximum potential of the reducing agent may theoretically be raised to $E^0_2$.

The reducing agents used in the invention satisfy these characteristics and are thus suitable for dissolving iodine in the form of iodide in the aqueous solution. Among these reducing agents, hydroxylamine and sodium ascorbate are preferred.

Hydroxylamine has the advantage of giving inert gaseous oxidation products, namely nitrogen ($N_2$) and nitrous oxide ($N_2O$).

It may also be noted that the use of reducing agents such as hydroxylamine and ascorbic acid, and the salts and derivatives thereof, is advantageous since they belong to the family of water-soluble organic compounds containing only C, H, O and N, which may be destroyed without formation of corrosive products and without increasing the saline charge of the effluent solutions.

To perform the process of the invention, it suffices to immerse the solid iodine filter in the aqueous solution of reducing agent having a suitable pH. The aqueous solution may also be circulated through the filter.

The aqueous solution generally used is one whose pH is adjusted to a value in the range from 10 to 14, or even more basic with an $OH^-$ ion concentration that may be up to 2 or even 3 mol.$L^{-1}$.

This may be performed using a mineral base, for example sodium hydroxide, or a water-soluble organic base such as tetramethylammonium hydroxide, aqueous ammonia or the like. This solution is chosen as reducing agent to limit, preferably, the degradation of the support, the partial dissolution of which during the processing might lead to an untimely reprecipitation in the following stages of processing of the solutions.

Preferably, a sodium hydroxide solution with a pH ranging from 10 to 14, or even more basic with an $OH^-$ ion concentration that may be up to 2 or even 3 mol.$L^{-1}$, is used.

The reducing agent concentration of this aqueous solution is chosen so as to ensure solubilization of the iodine under the best conditions. This concentration is generally from 0.5 to 2 mol.$L^{-1}$.

For the placing in contact, from 40 to 250 ml of aqueous solution per 10 g of filter, i.e. from 40 to 250 g of filter per litre of solution is preferably used: 250 g/L corresponding approximately to the minimum volume to submerge the filter.

The reductive dissolution treatment may be performed at room temperature or at a higher temperature, preferably at a temperature from 20 to 60° C., for a period of from about 15 minutes to 4 hours, for example from about 30 minutes to 2 hours.

By working under these conditions, the residual iodine content of the solid filter is less than or equal to 1.1 mg per g of filter, which corresponds to a decontamination factor of greater than or equal to 127 for an initial content of 140 mg of iodine per gram of filter. The silver content is between 100 and 120 mg per g of filter for an initial content of about 125 mg.

After this placing in contact of the solid iodine filter with the aqueous solution of reducing agent, the decontaminated filter is generally rinsed with water or an aqueous solution having a pH of greater than or equal to 7.

This rinsing may be followed, if necessary, by drying, for example by simple draining or by circulation of air, depending on the residual moisture level that is admissible for the conditioning for the purpose of surface storage.

When the solid iodine filter contains unconverted silver nitrate, a pretreatment to dissolve the silver nitrate in a dilute acid solution such as 0.1M nitric acid solution may be performed before performing the reductive treatment. This makes it possible to dissolve the unconverted silver nitrate and thus to reduce the amount of reagents subsequently employed, which would otherwise also serve for the reduction of the silver nitrate to silver metal, needlessly consuming a fraction of the reductive silver.

If it is performed, this pretreatment must be followed by careful rinsing of the iodine filter with water to reduce the subsequent consumption of base.

According to one working variant of the process of the invention, if it is desired to perform a more thorough decontamination of the filter, dissolution of the silver present in the filter into an aqueous solution is also performed.

This may be performed, after having separated the solid filter from the aqueous solution of reducing agent, by placing the filter thus separated in contact with a silver-dissolving solution.

Solutions that may be suitable for use are, for example, oxidative acidic solutions. A nitric solution or a solution with a redox potential of greater than +0.7991 V/ENH, which would not oxidize the iodide ion, may be used in particular.

This solution may be a nitric acid solution, with a nitric acid concentration of from 2 to 6 $mol.L^{-1}$.

This dissolution of the silver in the aqueous solution of reducing agent may also be performed simultaneously, for example by adding to this aqueous solution a silver-complexing agent, for example potassium cyanide.

When the reductive treatment and the dissolution of the silver are performed successively, the cycle comprising the steps below may be performed at least twice:

a) reductive treatment of the iodine filter with an aqueous solution of the reducing agent, having a pH of from 10 to 14, or even more basic with an $OH^-$ ion concentration that may be up to 2 or even 3 $mol.L^{-1}$, b) separation of the filter from the aqueous solution, and c) dissolution of the silver by immersing the filter separated out in step b) in a nitric acid solution with a nitric acid concentration of from 2 to 6 $mol.L^{-1}$.

In this case, the iodine filter is alternately immersed in a reductive aqueous solution and in an acidic aqueous solution to perform one or more reduction-dissolution cycles.

The reductive solution reduces the silver iodide to silver metal, which remains predominantly in the pores of the solid support, partially blocking them and limiting the decontamination process. The effect of the nitric acid solution is to dissolve the silver metal, thus allowing the reduction reaction to proceed to the next cycle.

Two or three cycles with or without final nitric washing may be performed, resulting in a very substantial lowering of the residual iodine content in the filter.

Preferably, in this embodiment of the process of the invention, careful rinsing of the solid iodine filter in water is performed after each reductive or acidic treatment, to reduce the consumptions of base and of nitric acid, since an acidic reductive solution is inoperative.

When the reductive treatment and the dissolution of the silver are performed simultaneously, the iodine filter is treated in an aqueous solution having a pH of from 10 to 14, or even more basic with an $OH^-$ ion concentration that may be up to 2 or even 3 $mol.L^{-1}$, containing the reducing agent and a cyanide such as potassium cyanide, to simultaneously dissolve the silver metal in the aqueous solution.

This simultaneous dissolution is advantageous compared with the successive reductive and dissolution treatments since it requires only one solution and thus makes it possible to avoid the alternation of reductive treatment and of acidic washing. This is reflected by fewer rinses and a marked reduction in the volumes of solutions used and in the volumes of effluents to be subsequently treated.

The process of the invention is advantageous since it is efficient enough not to require the opening of the cartridge containing the mineral trap beads. At the very most, a forced circulation of the solutions through the cartridge can facilitate and accelerate the decontamination operation; otherwise, simple dipping may suffice. After rinsing and drying, the decontaminated filter may be conditioned directly in cement. The formation of mineral fines from the support beads (partial disintegration) may necessitate a filtration of the solutions used.

For the sake of safety, during the acidic washing (pre-washing of the filter to dissolve the unconverted silver nitrate and dissolution of the silver metal between two reductive treatments), it is possible to guard against a potential release of iodine by performing a basic washing of the gases, the effluent of which may be mixed with the solution used for the reductive treatment.

Other characteristics and advantages of the invention will emerge more clearly on reading the examples that follow, which are obviously given as non-limiting illustrations.

DETAILED DESCRIPTION OF THE EMBODIMENTS

Examples 1 to 5 given below relate to the processing, via the process of the invention, of 10 grams of filter consisting of porous alumina beads containing 140 mg of iodine per g of charged filter. The filter contains about 12.5% of elemental silver by mass, initially in the form of nitrate; 140 mg of elemental iodine per gram of filter correspond to saturation of the filter, i.e. to the total conversion of the silver nitrate to solid silver iodide and silver iodate in the porosity. The reducing agents used are sodium ascorbate (Examples 1 to 4) and hydroxylammonium nitrate or HAN ($NH_3OH^+$, $NO_3^-$) in Example 5.

EXAMPLE 1

The reductive treatment is performed by immersing the filter (contained in a metal gauze envelope similar to that of the actual filter cartridge) in 40 ml of reductive solution containing 2 mol of ascorbate per litre, pH=14, for 4 hours at 60° C.; there is no circulation of the solution or movement of the beads. The ratio of the mass of filter to the volume of solution is 250 g per litre. The reductive solution is removed and, with the filter still in its envelope, rinsing is performed with water or with a solution of pH≧7. The residual iodine content in the filter is then measured: it is 0.8 mg per gram, which corresponds to a decontamination factor of 175.

EXAMPLE 2

The reductive treatment is performed by immersing the filter (contained in a metal gauze envelope similar to that of the actual filter cartridge) in 250 ml of reductive solution containing 0.5 mol of ascorbate per litre, pH=14, for 4 hours at 60° C.; there is no circulation of the solution or movement of the beads. The ratio of the mass of filter to the volume of solution is 40 g per litre. The reductive solution is removed and, with the filter still in its envelope, rinsing is performed with water or with a solution of pH≧7 and then drying. The residual iodine content in the filter is then measured: it is 1.1 mg per gram, which corresponds to a decontamination factor of 127.

EXAMPLE 3

The reductive treatment is performed by immersing the filter (contained in a metal gauze envelope similar to that of the actual filter cartridge) in 250 ml of reductive solution containing 2 mol of ascorbate per litre, pH=11, for 4 hours at 60° C.; there is no circulation of the solution or movement of the beads. The ratio of the mass of filter to the volume of solution is 40 g per litre. The reductive solution is removed and, with the filter still in its envelope, rinsing is performed with water or with a solution of pH≧7 and then drying. The residual iodine content in the filter is then measured: it is 0.9 mg per gram, which corresponds to a decontamination factor of 156.

EXAMPLE 4

The reductive treatment is performed by immersing the filter (contained in a metal gauze envelope similar to that of the actual filter cartridge) in 40 ml of reductive solution containing 2 mol of ascorbate per litre, pH=11, for 4 hours at 60° C.; there is no circulation of the solution or movement of the beads. The ratio of the mass of filter to the volume of solution is 250 g per litre. The reductive solution is removed and, with the filter still in its envelope, rinsing is performed with water or with a solution of pH≧7 and then drying. The residual iodine content in the filter is then measured: it is 0.7 mg per gram, which corresponds to a decontamination factor of 200.

EXAMPLE 5

The reductive treatment is performed by immersing the filter (contained in a metal gauze envelope similar to that of the actual filter cartridge) in 250 ml of reductive solution containing 2 mol of hydroxylammonium nitrate or HAN ($NH_3OH^+$, $NO_3^-$) per litre, pH=13, for 4 hours at 25° C.; there is no circulation of the solution or movement of beads. The ratio of the mass of filter to the volume of solution is 40 g per litre. The reductive solution is removed and, while the filter is still in its envelope, rinsing is performed with water or with a solution of pH≧7.

The residual iodine content in the filter is then measured: it is 2.0 mg per gram, which corresponds to a decontamination factor of 70.

Efficient decontamination is thus observed in a single attack at room temperature, which is very close to that obtained by Modolo et al. with several attacks at elevated temperature.

The results obtained in Examples 1 to 5 show that the use of a single reductive basic wash by simple dipping of the filter, using reducing agents consisting of ascorbic acid or ascorbic acid salts, ascorbyl esters or hydroxylamine and its salts, affords a real advantage over the process used by Modolo starting with hydrazine.

Thus, the process of the invention already makes it possible to go beyond the specifications imposed for surface storage, since the contents measured during the tests reach values as low as 0.7 mgI/g of filter (decontamination factor=200 for an initial iodine content of 140 $mg.g^{-1}$) or slightly higher depending on the operating conditions. These values are always about half the size of those obtained by Modolo et al. with the process using hydrazine, which, moreover, would not be efficient enough to allow the declassification of the filters in all the cases of conditioning.

Moreover, the process of the invention consists of a single reductive basic wash by simple dipping of the whole filter cartridge in a tank, which is extremely simple to carry out (absence of alternate sequences of decantation/filtration/washing as proposed by Modolo).

Finally, no purple vapours derived from the untimely or uncontrolled desorption of iodine were ever observed in the gases during the implementation of the process with the abovementioned reducing agents, given the pH used, which is high enough to bring about the dismutation and/or reduction of the molecular iodine.

Examples 6 to 9 below illustrate a thorough decontamination of iodine filters by performing the working variant of the process of the invention.

EXAMPLE 6

In this example, the working variant of the process of the invention also comprising the dissolution of the silver is used, to process a 70 kg iodine filter, consisting of porous alumina beads, containing 140 mg of iodine per g of $Al_2O_3$ (filter containing about 12.5% silver by mass, initially in the form of nitrate; 140 mg of iodine per gram of $Al_2O_3$ correspond to saturation of the filter, i.e. the total conversion of the silver nitrate to silver iodide and silver iodate).

In the first step, the reductive treatment is performed by immersing the iodine filter in a sodium hydroxide solution with a pH of 13, containing 2 mol/L of hydroxylamine, at a temperature of 60° C., for about 30 minutes. The iodine filter is then removed from the solution, and rinsed with water, and the second step of acidic treatment is then performed by immersing the rinsed iodine filter in an aqueous solution containing 6 mol/L of nitric acid, at a temperature of 60° C., for about 15 minutes. The iodine filter is then removed from this solution and is subjected to rinsing with water.

The whole treatment cycle described above comprising the reductive treatment and the acidic treatment is repeated twice.

At the end of the operation, the residual iodine content of the iodine filter is less than 0.03 mg of iodine per gram of the solid support (30 ppm) and its silver content is of the same order but slightly higher, i.e. less than or equal to 100 ppm.

The maximum volumes of solutions required for the treatments and rinses are of the order of one $m^3$ for this 70 kg filter.

The silver present in the nitric solutions derived from the dissolution treatment represents about 8.4 kg. It may thus be almost quantitatively recovered.

EXAMPLE 7

The same procedure as in Example 6 is followed, to process an identical filter, but a sodium hydroxide solution of pH 13 containing 2 mol/L of sodium ascorbate instead of hydroxylamine is used for the reductive treatment.

The results obtained are identical to those of Example 6.

EXAMPLE 8

In this example, a 70 kilogram iodine filter, containing 140 mg of iodine per g of $Al_2O_3$ is processed by simultaneously performing the dissolution of the silver.

In this case, the filter is immersed in a sodium hydroxide solution of pH 13 containing 2 mol/L of hydroxylamine and 4 mol/L of potassium cyanide KCN, at a temperature of 60° C. for about four hours, after which it is extracted from the solution and rinsed.

Under these conditions, a filter whose residual iodine content is less than or equal to 0.030 mg of iodine per gram of filter (i.e. 30 ppm) is obtained at the end of the operation. The silver is also almost quantitatively recovered in the sodium hydroxide solution.

EXAMPLE 9

The same procedure as in Example 8 is followed, to process an identical filter, but sodium ascorbate is used instead of hydroxylamine, at a concentration of 2 mol/L.

Equivalent Results are Obtained.

The process of the invention is thus very advantageous since it makes it possible to achieve a very high level of decontamination while at the same time being easy to perform since the decontamination is carried out in aqueous solution in a simple tank.

Moreover, the effluents generated by this process are compatible with the effluents from factories for reprocessing nuclear fuels.

In the variant of the process according to which the silver is dissolved by means of cyanide, it is necessary to ensure that the solution will never be subsequently acidified, so as to avoid the release of hydrogen cyanide. The best approach is to destroy the cyanide immediately after the decontamination and separation of the decontaminated filter. This may be performed by adding excess ferrous sulphate, which gives stable hexacyanoferrate(II) complexes.

REFERENCES CITED

[1] G. Modolo and R. Odoj, Proc. International Conference on Evaluation of Emerging Nuclear Fuel Cycle Systems (Global 1995), 11 to 14 Sep. 1995, Versailles, France, Vol. 2, pp. 1244–1251

[2] Nuclear Technology, Vol. 117, 1997, p. 80–86

The invention claimed is:

1. A process for decontaminating a solid iodine filter comprising silver iodide, silver iodate and/or physisorbed molecular iodine, which comprises:

placing the filter in contact with an aqueous solution of a reducing agent selected from the group consisting of ascorbic acid, ascorbic acid salts, and mixtures thereof, thereby extracting the iodine from the filter and dissolving it in the aqueous solution.

2. The process according to claim 1, wherein the reducing agent is sodium ascorbate.

3. The process according to claim 1, wherein the aqueous solution has a pH of 10 to 14.

4. The process according to claim 1, wherein the concentration of reducing agent in the aqueous solution is from 0.5 to 2 mol.$L^{-1}$.

5. The process according to claim 1, wherein the solid iodine filter comprises a porous mineral solid support based on silica or alumina impregnated with silver nitrate.

6. The process according to claim 5, wherein the iodine filter comprises silver nitrate not converted into silver iodide and/or silver iodate, the filter is subjected beforehand to a treatment to dissolve the silver nitrate in a dilute acidic solution, before carrying out the placing in contact of the filter with the aqueous solution of reducing agent.

7. The process according to claim 6, wherein the dissolution of the silver present in the filter in an aqueous solution is also performed.

8. The process according to claim 7, wherein the dissolution of the silver in an aqueous solution other than that of the reducing agent is performed, after having separated the filter from the aqueous solution of reducing agent, by placing the filter thus separated in contact with a silver-dissolving solution.

9. The process according to claim 8, wherein the silver-dissolving solution is a nitric acid solution with a nitric acid concentration of from 2 to 6 mol.$L^{-1}$.

10. The process according to claim 9, wherein a cycle comprising the steps below is performed at least twice:

a) reductive treatment of the iodine filter with an aqueous solution of the reducing agent, having a pH of from 10 to 14, b) separation of the filter from the aqueous solution, and c) dissolution of the silver by immersing the filter separated out in step b) in a nitric acid solution with a nitric acid concentration of from 2 to 6 mol.$L^{-1}$.

11. The process according to claim 7, in which the dissolution of the silver in the aqueous solution of reducing agent is simultaneously performed, and the aqueous solution of reducing agent further comprises a silver-complexing agent.

12. The process according to claim 11, wherein the silver-complexing agent is potassium cyanide.

13. The process according to claim 1, wherein the aqueous solution has an $OH^-$ ion concentration of up to 2 mol.$L^{-1}$.

14. The process according to claim 1, wherein the aqueous solution has an $OH^-$ ion concentration of up to 3 mol.$L^{-1}$.

15. The process according to claim 9, wherein a cycle comprising the steps below is performed at least twice:

a) reductive treatment of the iodine filter with an aqueous solution of the reducing agent, having an $OH^-$ ion concentration of up to 2 mol.$L^{-1}$, b) separation of the filter from the aqueous solution, and c) dissolution of the silver by immersing the filter separated out in step b) in a nitric acid solution with a nitric acid concentration of from 2 to 6 mol.$L^-$.

16. The process according to claim 9, wherein a cycle comprising the steps below is performed at least twice:

a) reductive treatment of the iodine filter with an aqueous solution of the reducing agent, having an $OH^-$ ion concentration of up to 3 mol.$L^{-1}$, b) separation of the filter from the aqueous solution, and c) dissolution of the silver by immersing the filter separated out in step b) in a nitric acid solution with a nitric acid concentration of from 2 to 6 mol.$L^{-1}$.

* * * * *